(12) United States Patent
Ogura

(10) Patent No.: US 6,932,499 B2
(45) Date of Patent: *Aug. 23, 2005

(54) LIGHT CONDUCTIVE MEMBER, ILLUMINATING DEVICE HAVING THE SAME, AND INFORMATION PROCESSING APPARATUS HAVING THE ILLUMINATING DEVICE

(75) Inventor: Makoto Ogura, Isehara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/342,255

(22) Filed: Jun. 29, 1999

(65) Prior Publication Data

US 2002/0080621 A1 Jun. 27, 2002

Related U.S. Application Data

(62) Division of application No. 08/617,634, filed on Mar. 19, 1996, now Pat. No. 6,015,200.

(30) Foreign Application Priority Data

Mar. 22, 1995 (JP) ............................................. 7-62601
Mar. 13, 1996 (JP) ............................................. 8-55881

(51) Int. Cl.[7] ............................................. F21V 8/00
(52) U.S. Cl. .................. 362/551; 362/555; 358/484
(58) Field of Search ....................... 362/551, 555, 362/26, 213, 231, 31, 559; 347/3; 250/208.1; 358/475, 484

(56) References Cited

U.S. PATENT DOCUMENTS

| 2,770,712 A | * 11/1956 | Dros ............................ 362/26 |
|---|---|---|
| 4,313,124 A | 1/1982 | Hara ........................... 346/140 |
| 4,345,262 A | 8/1982 | Shirato et al. .............. 346/140 |
| 4,459,600 A | 7/1984 | Sato et al. .............. 346/140 R |
| 4,463,359 A | 7/1984 | Ayata et al. .................. 346/1.1 |
| 4,558,333 A | 12/1985 | Sugitani et al. ............. 346/140 |
| 4,723,129 A | 2/1988 | Endo et al. ................... 346/1.1 |
| 4,740,796 A | 4/1988 | Endo et al. ................... 346/1.1 |
| 4,791,493 A | 12/1988 | Ogura et al. ................. 358/294 |
| 4,816,968 A | * 3/1989 | Yamada et al. ............. 362/268 |
| 4,920,431 A | 4/1990 | Ogura et al. ................. 358/496 |
| 4,996,606 A | 2/1991 | Kawai et al. ................ 358/475 |
| 5,101,285 A | 3/1992 | Kawai et al. ................ 358/471 |
| 5,128,781 A | * 7/1992 | Ohno et al. .................... 359/48 |
| 5,196,691 A | 3/1993 | Kitani et al. ............. 250/208.1 |
| 5,352,883 A | 10/1994 | Kitani et al. ............. 250/208.1 |
| 5,499,112 A | 3/1996 | Kawai et al. ................ 358/475 |
| 5,526,141 A | 6/1996 | Ogura et al. ................. 358/496 |
| 5,900,622 A | 5/1999 | Ogura et al. ............. 250/208.1 |
| 6,172,356 B1 | 1/2001 | Ogura et al. ........... 250/227.11 |

FOREIGN PATENT DOCUMENTS

| EP | 0 607 930 | 7/1994 |
|---|---|---|
| JP | 59-123670 | 7/1984 |
| JP | 59-138461 | 8/1984 |

* cited by examiner

Primary Examiner—Thomas M. Sember
(74) Attorney, Agent, or Firm—Fitzpatrick, Cella, Harper & Scinto

(57) ABSTRACT

For providing a compact illuminating device capable of uniform illumination with a high intensity, there is provided a light conductive member including a light entrance face provided in a part of a lateral face of a rod-shaped translucent member, an area provided on a side opposed to the light entrance face, for reflecting and/or diffusing the entered light in the longitudinal direction of the translucent member, and an exit face provided in at least a part of a lateral face other than those on which the area and the light entrance face are provided, for emitting at least a part of thus reflected and/or diffused light beam.

6 Claims, 14 Drawing Sheets

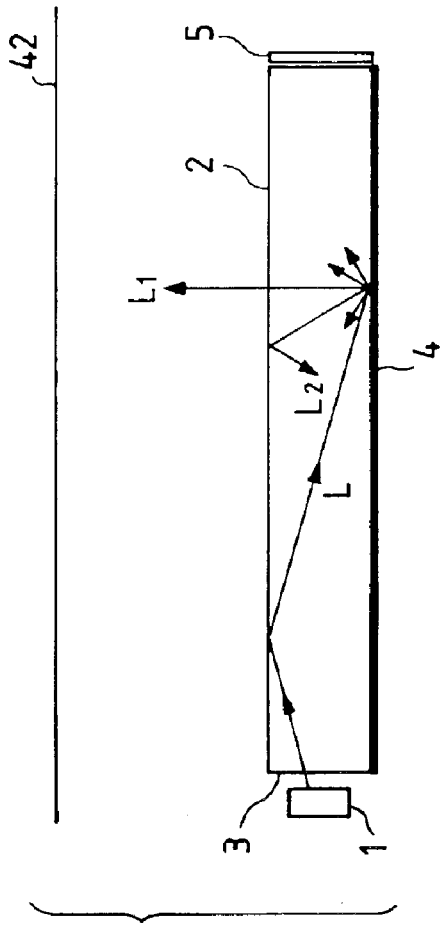
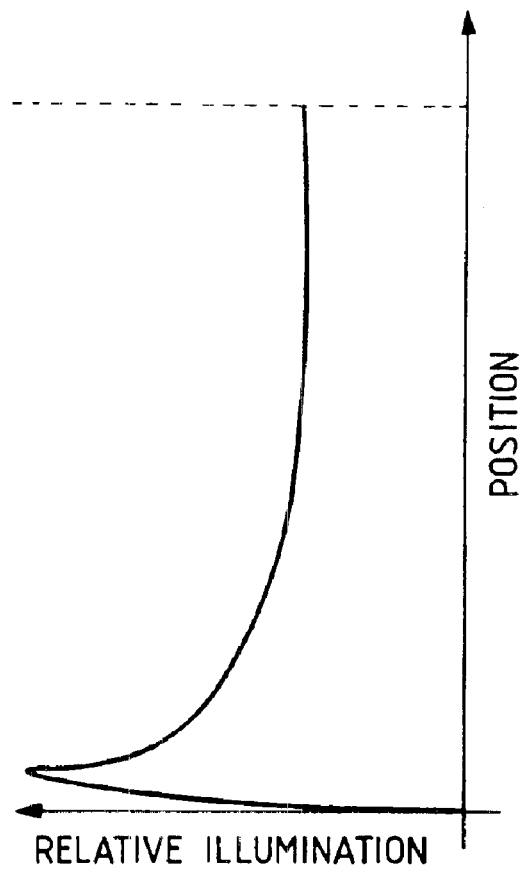
FIG. 2A PRIOR ART
FIG. 2B PRIOR ART
FIG. 2C PRIOR ART

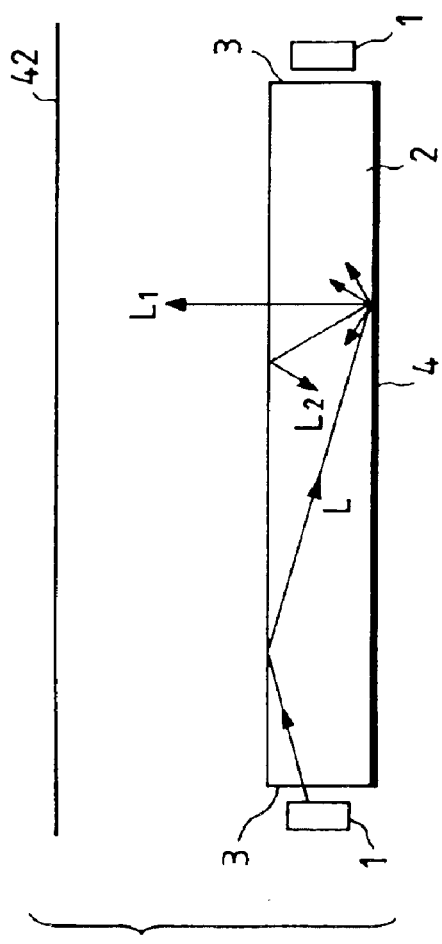
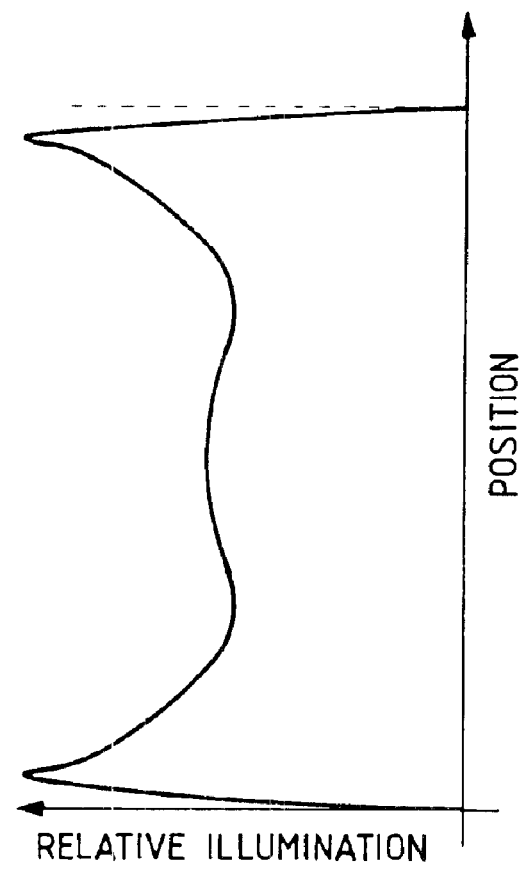
FIG. 3A PRIOR ART
FIG. 3B PRIOR ART
FIG. 3C PRIOR ART

LIGHT CONDUCTIVE MEMBER, ILLUMINATING DEVICE HAVING THE SAME, AND INFORMATION PROCESSING APPARATUS HAVING THE ILLUMINATING DEVICE

CROSS-REFERENCE TO RELATED APPLICATION

This application is a division of U.S. application Ser. No. 08/617,634, filed Mar. 19, 1996 now U.S. Pat. No. 6,015,200.

BACKGROUND OF THE INVENTION

1. Field of the Invention

The present invention relates to a light conductive member, an illuminating device having the light conductive member, and an information processing apparatus having the illuminating device.

2. Related Background Art

For an illuminating device for the reading device of the information processing apparatus such as a facsimile apparatus, an electronic copying machine or the like, there has been employed a discharge tube such as a fluorescent tube or an LED array consisting of a linear array of a multitude of LED chips. Particularly in recent years, the use of the LED array has become popular as the demand for compacter and less expensive products is increasing with the increase of in-home use for example of the facsimile apparatus.

An example of the illuminating device utilizing such LED array will be explained with reference to FIGS. 1A and 1B. In FIG. 1A there are shown an LED array 41, illuminated surface 42 such as a surface of an original, and LED chips 43. FIG. 1A illustrates the schematic configuration of the illuminating device employing the LED array, together with the illuminated surface (original), while FIG. 1B shows an example of illumination intensity distribution on the original surface when the original is illuminated with the illuminating device shown in FIG. 1A.

The illumination intensity distribution on the original surface depends on the number of the LED chips 43 employed, and, if the density of the LED chips 43 is reduced for the purpose of cost reduction, because of the increased interval of the LED chips 43, the illumination intensity distribution on the illuminated surface becomes uneven as shown in FIG. 6B. Consequently it becomes not only impossible to achieve uniform illumination but also there are generated portions which are not illuminated with the sufficient amount of light. As the exact original reading becomes difficult under extremely uneven illumination, there has been a limit in the cost reduction by the decrease of the number of the LED chips.

On the other hand, for a linear illuminating device for expanding the light from a light source in linear shape, there can be conceived a configuration as shown in FIGS. 2A and 2B. In a schematic lateral view and a schematic cross-sectional view respectively in FIGS. 2A and 2B, there are shown a light source 1 such as a halogen lamp, a tungsten lamp or an LED chip, a translucent member 2 with a circular cross section such as a quartz rod, an entrance face 3 of the translucent member 2 for the entry of the light beam from the light source 1, and an area 4 for reflecting or scattering the light, propagating in the translucent member 2, for taking the light out of the translucent member 2. This area 4 is formed, for example, by forming a coarse surface or applying light scattering/reflecting paint on a part of the surface of the translucent member 2.

A reflecting face 5 is provided at an end, opposite to the light source 1, of the translucent member 2, and may be formed by evaporating a metal such as aluminum on an end face of the translucent member 2 itself, or by applying light scattering/reflecting paint, or may be provided as a separate member. The cross-sectional shape of the translucent member 2 is not limited to circular but may also be square or rectangular. FIG. 2C shows the obtained illumination intensity distribution.

As shown in FIG. 2A, the light beam L emitted from the light source 1 and entering the translucent member 2 from the entrance face 3 thereof propagates therein by repeating reflections on the inner face of the translucent member 2, then reflected by the end face opposite to the entrance face 3 upon reaching the above-mentioned opposite face and propagates again in the translucent member 2. When the light enters the area 4 in the course of repeated reflections, the light beam is scattered and a part L1 the light is emitted to the outside through a side opposite to the area 4. The remaining part L2 of the scattered light obliquely enters the exit face thereby being totally reflected thereby and propagates again in the translucent member. Thus, after the repetion of propagation, the light eventually reaching the entrance face 3 is emitted to the outside through the entrance face 3.

In case a light bulb such as a tungsten lamp is employed as the light source 1, the amount of emitted light can be increased by increasing the electric power even despite of the loss of light emitted from the entrance face 3, there can be obtained a reasonably high illumination intensity.

However, such electric light bulb is associated with drawbacks that a high electric power consumption is required for obtaining a high illumination intensity, and that the device cannot be made compact because of the large amount of heat generation. In addition, the service life of the electric bulb is considerably short, even in comparison with that of the fluorescent lamp, necessitating replacements as a result of decrease in the light intensity and filament breakage, so that a maintenance-free device as in the case of LED cannot be obtained.

For these reasons, the illuminating device as the reading light source of the information processing apparatus such as the facsimile apparatus preferably employs an LED light source and has such a configuration as to emit the light therefrom in linear form.

On the other hand, in case an LED is employed as the light source 1, the illumination intensity becomes inevitably low as the light emission amount is less than that of the electric bulb.

For example, in the configuration shown in FIG. 2A, the illumination intensity is high at the side of the light source 1 but is low at the side of the end face opposite to the entrance face 3, thereby providing an extremely uneven illumination.

For resolving this drawback, there is proposed, as shown in a schematic lateral view in FIG. 3A, a method of positioning light sources 1 on both ends of the translucent member 1. As the illumination intensity distribution is compensated by the light beams entering from both ends, the distribution assumes a form as shown in FIG. 3C, which is more uniform than that in FIG. 3B. In this case the cross-sectional configuration is as shown in FIG. 3B and same as that shown in FIG. 2B.

However, even the configuration shown in FIGS. 3A and 3B may still result in the following drawbacks:

(1) As the light sources are positioned longitudinally with the translucent member, the illuminating device becomes longer in comparison with the effective illuminating length of the translucent member;

(2) In case the amounts of light emission of the light sources on both ends are mutually different, the illumination intensity distribution becomes slanted, and the adjustment of the amounts of light emission of both light sources requires an additional cost;

(3) As the device is easily influenced by the longitudinal elongation or contraction of the translucent member, such influence has to be absorbed by the holding structure of the light sources, and, for this reason, it is difficult to achieve satisfactory heat dissipation;

(4) As the electric power supply has to be made to the light sources on both ends, an increased cost is required for the wirings; and (5) In order to increase the illumination intensity for the entire device, it is necessary, for example, to increase the number of LED chips in the light sources. Such increase requires a corresponding increase of the light entrance face of the translucent member, thus resulting in a larger dimension of the illuminating device and the information processing apparatus.

Also in the color image reading by switching the emission wavelength of the light source and reading the reflected light from the original at each wavelength, the above-mentioned drawbacks (1) to (5) become more serious as the number of signal lines increases for switching the emission wavelength.

SUMMARY OF THE INVENTION

An object of the present invention is to resolve drawbacks that the conventional illumination means employing a linear array of LED chips and the information processing apparatus utilizing such illumination means are unable to achieve a sufficiently low cost because of the large number of LED chips required and have a limit in the reduction of power consumption even with the use of LED's, and that an extremely uneven illumination state is obtained with a high illumination intensity on the original surface corresponding to the positions of the LED chips and a low intensity in the positions between the LED chips when the number of LED's is decreased in the LED array, or the illumination intensity on the original surface becomes uneven when the LED chips are positioned on the end faces of the translucent member, or an additional circuit is required for compensating the unevenness in the illumination intensity distribution, leading to a higher cost.

Another object of the present invention is to resolve drawbacks of a high electric power consumption associated with the illuminating means utilizing the electric bulb and the information processing apparatus utilizing such illuminating means, or of a high amount of heat generation which hinders compactization of the device, or of difficulty in realizing a maintenance-free configuration.

Still another object of the present invention is to provide an illuminating device of a high uniformity of the illumination intensity and a lower electric power consumption, allowing easy compactization, a light conductive member for use in such illuminating device and an information processing apparatus utilizing such illuminating device.

Still another object of the present invention is to provide an illuminating device of a high uniformity of the illumination intensity and a low electric power consumption, allowing easy compactization and cost reduction, adapted for use in the color image reading by switching the emission wavelength of the light source, a light conductive member for use in such illuminating device and an information processing apparatus utilizing such illuminating device.

Still another object of the present invention is to provide a light conductive member consisting of a rod-shaped translucent member having a light entrance face in a part of the lateral face thereof, an area positioned opposite to the light entrance face, for reflecting and/or diffusing the entering light beam in the longitudinal direction of the rod-shaped translucent member and an exit face for emitting at least a part of thus reflected and/or diffused light beam, formed in at least a part of the lateral face excluding the above-mentioned area and the light entrance face, an illuminating device utilizing the above-mentioned light conductive member and an information processing apparatus utilizing such illuminating device.

Still another object of the present invention is to provide a light conductive member provided with a light entrance portion formed in at least a part of a longitudinal lateral face, called a first side, of a translucent member; an area formed on a second side opposed to the light entrance portion, for reflecting or diffusing the light entering the translucent member principally to outside the light entrance portion within the above-mentioned translucent member; a light reflecting or diffusing area formed on a third side different from the first or second side; and a fourth side opposed to the third side, for emitting the light to the outside of the translucent member.

Still another object of the present invention is to provide an illuminating device comprising a light conductive member provided with a light conductive member having a light entrance portion formed in at least a part of a longitudinal lateral face, called a first side, of a translucent member; an area formed on a second side opposed to the light entrance portion, for reflecting or diffusing the light entering the translucent member principally to outside the light entrance portion within the above-mentioned translucent member; a light reflecting or diffusing area formed on a third side different from the first or second side; and a fourth side opposed to the third side, for emitting the light to the outside of the translucent member, and a light source provided corresponding to the light entrance portion.

Still another object of the present invention is to provide an information processing apparatus comprising:

a photoelectric conversion device having a plurality of photoelectric conversion elements and positioned opposite to an image to be read;

an illumination device for illuminating the image;

wherein said illuminating device includes a light conductive member provided with a light conductive member having a light entrance portion formed in at least a part of a longitudinal lateral face, called a first side of a translucent member; an area formed on a second side opposed to the light entrance portion, for reflecting or diffusing the light entering the translucent member principally to outside the light entrance portion within the above-mentioned translucent member; a light reflecting or diffusing area formed on a third side different from the first or second side; and a fourth side opposed to the third side, for emitting the light to the outside of the translucent member, and a light source provided corresponding to the light entrance portion;

an output unit for recording an image on a document by electric signals corresponding to the image information; and a controller for controlling the photoelectric conversion device, the light source and the output unit.

BRIEF DESCRIPTION OF THE DRAWINGS

FIGS. 1A, 2A and 3A are schematic lateral views showing examples of configuration of conventional illuminating devices;

FIGS. 2B and 3B are schematic cross-sectional views thereof;

FIGS. 1B, 2C and 3C are charts showing examples of the illumination intensity distribution when a surface is illuminated by the devices respectively shown in FIGS. 1A, 2A and 3A;

DETAILED DESCRIPTION OF THE PREFERRED EMBODIMENTS

Through intensive investigations, the present inventors have found that the aforementioned objects can be attained by a suitable shape of the light conductive member and a position of the light source.

More specifically, the present invention has been based on a finding that the aforementioned objects can be attained by a light conductive member of which cross section, along a plane perpendicular to the longitudinal direction thereof, is not constant, and which has a light entrance area and an area for reflecting or diffusing the light entering from the light entrance area into the light conductive member, in a portion other than the end portions of the light conductive member.

In the following the present invention will be explained in detail by preferred embodiment thereof shown in the attached drawings.

[First Embodiment]

Figure 1A:
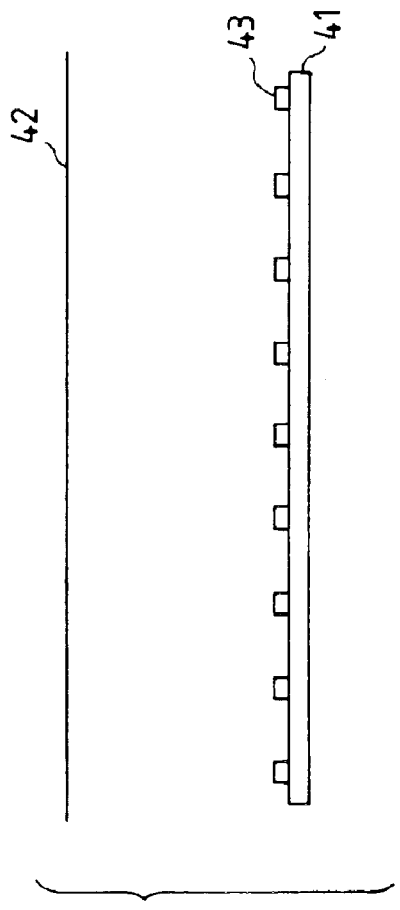
Figure 1B:
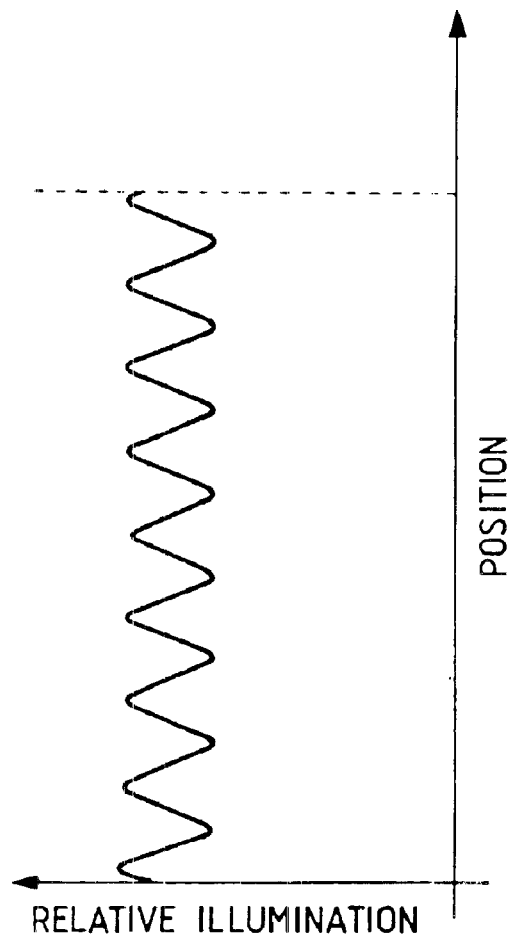
Figure 4A:
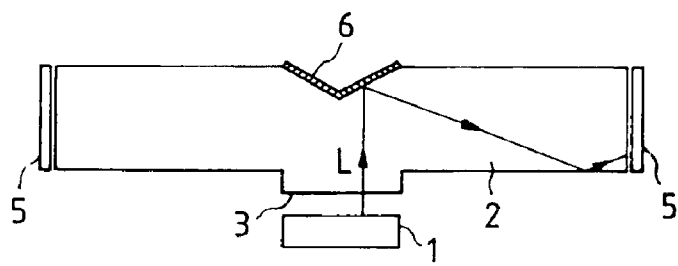
FIGS. 4A and 5A are schematic plan views showing preferred embodiments of the illuminating device of the present invention.
Figure 4B:
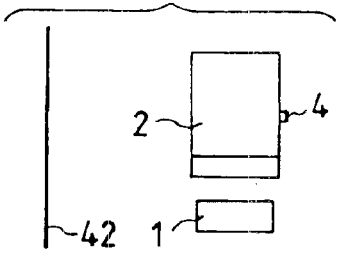
FIGS. 4B, 4C, 5B and 5C are lateral views thereof.
Figure 4C:
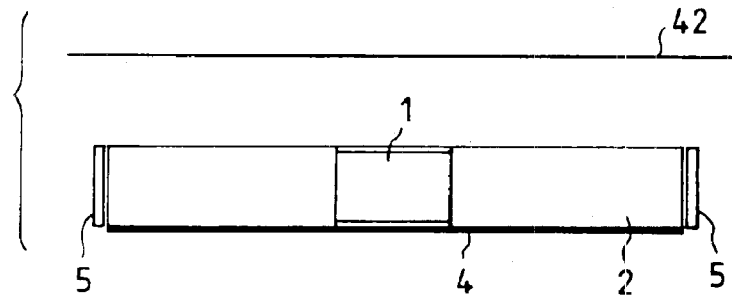
Figure 4D:
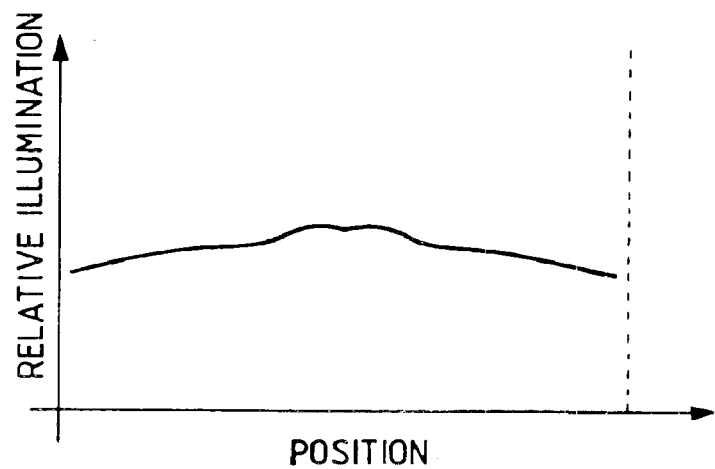
FIGS. 4D and 5D are charts showing examples of the illumination intensity distribution thereof.

FIGS. 4A to 4C illustrate an illuminating device constituting a preferred embodiment of the present invention and are respectively a schematic plan view seen from an exit face side for the light beam, a schematic lateral view seen from the side of an end face in the longitudinal direction of a light conductive member and a schematic lateral view seen from the side of a light entrance face, and FIG. 4D is a chart showing an example of the illumination intensity distribution. Referring to FIGS. 4A to 4C, a translucent member 2 is provided with an entrance face 3 for introducing the light beam from a light source 1, on a part of a lateral face, and an area 6 provided in the opposite side, for reflecting and/or diffusing the light beam in the longitudinal direction of the translucent member 2. In FIG. 4A, it is illustrated in a recessed wedge shape, but it may have other shapes or may be replaced by a printed, coated or evaporated reflective film or by a coarse surface, as long as the reflecting and/or diffusing function can be obtained. Also the illustrated configuration has symmetrical angles with respect to the light entrance area, but these angles may be suitably varied for example according to the position of the light entrance face 3. Also the shape of such configuration is not limited to the wedge shape but may contain curved faces.

On both ends of the translucent member 2 there are provided reflecting faces 5 for reflecting the light beam propagating in the member 2.

The reflecting faces 5 and the reflecting and/or diffusing area 6 are formed by evaporating or adhering a metal of high reflectivity, such as aluminum, silver, gold or copper, on the end faces or a desired portion of the translucent member 2. Otherwise, paint containing white pigment such as barium oxide, barium sulfate, barium titanate, titanium oxide, lead white ($2PbCO_3Pb(OH)_2$), zinc oxide or calcium carbonate or pigment of other colors or particulate substance such as metal powder may be applied as light reflect/diffusing paint on the end faces or the desired portion. Otherwise, a member or members coated with such paint may be applied onto the end faces or the desired portion. The above-mentioned metal of high reflectivity is preferably composed of aluminum, in consideration of the cost and ease of adaptation to color image reading.

The reflective faces 5 are not necessarily indispensable and the light reflect/diffusing property can be obtained by forming coarse surface on both end faces of the translucent member 2, in case a sufficient amount of light is introduced into the translucent member 2 or depending upon the amount of light emitted from the translucent member 2 to the illuminated surface.

Also, as shown in FIGS. 4B and 4C, opposite to the light emitting face at the side of an illuminated surface 42, there is formed an area 4 for reflecting and/or diffusing the light propagating in the translucent member 2, thereby emitting the light from the translucent member 2 to the outside.

This area 4 allows the light, entering this area 4 to effectively propagate in the translucent member 2 and to reach the exit face efficiently.

This area 4 may be formed by forming a coarse surface or applying light reflect/diffusing paint as explained above, on a part of the translucent member 2.

The light beam from the light source 1 enters the translucent member 2 through the entrance face 3, and propagates toward the end faces in the longitudinal direction, by reflection and scattering in the area 6. The light beam propagates in the translucent member 2 by repeating reflection therein, then reflected by the reflective faces 5 on both ends and again propagates in the translucent member 2.

In the course of such repeated reflections, upon falling on the area 4, the light beam is diffused therein and a part of the light is taken out to the outside through the exit face opposite to the above-mentioned area 4. FIG. 4D shows an example of the obtained illumination intensity distribution.

The present embodiment provides the advantages that:

(1) the entire length of the light source device is shortened as the effective illumination length is practically determined by the translucent member 2 only;

(2) the sloping of the illumination intensity distribution, encountered in the conventional configuration, is significantly alleviated since the distribution on both sides is well balanced because of the fact that the light source is provided only in one location;

(3) the holding and heat dissipation of the light source 1 are made easy because it can be provided in a side position, less influenced by the expansion or contraction of the translucent member 2;

(4) the wirings are simplified and made lighter in weight, because the light source 1 is provided only in one location;

(5) a higher illumination intensity can be obtained in a smaller dimension, since the increase in the illumination intensity can be achieved by an enlargement in the light source 1 and the entrance face 3;

(6) in an illuminating device for color image reading utilizing light sources of plural emission wavelengths, the light sources can be positioned in concentrated manner, so that the layout thereof and the driving circuits therefor can be simplified and a lower cost and a smaller size can be achieved; and (7) the number of component parts can be reduced, and the manufacturing process can be made simpler.

[Second Embodiment]

FIGS. 5A to 5D show the illuminating device of another preferred embodiment of the present invention and are respectively a schematic plan view seen from the side of a light exit face, a schematic lateral view, a schematic plan view seen from the side of a light entrance face, and a chart showing an example of the illumination intensity distribution.

The basic configuration is same as that of the first embodiment shown in FIGS. 4A to 4C, and components equivalent to those in the first embodiment are represented by same numbers.

Figure 5A:
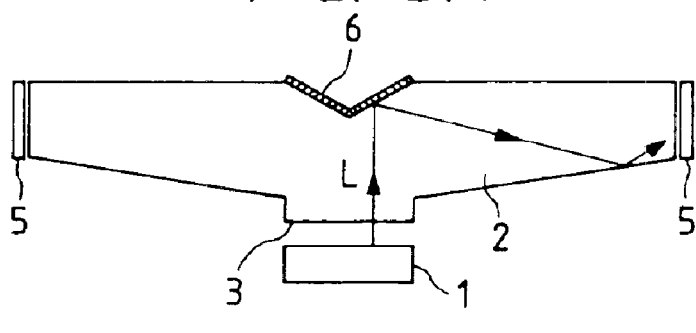
Figure 5B:
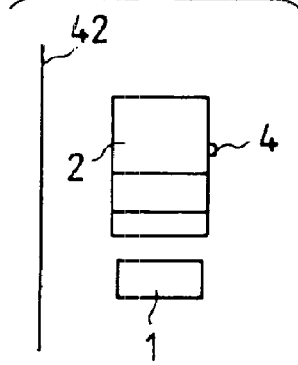
Figure 5C:
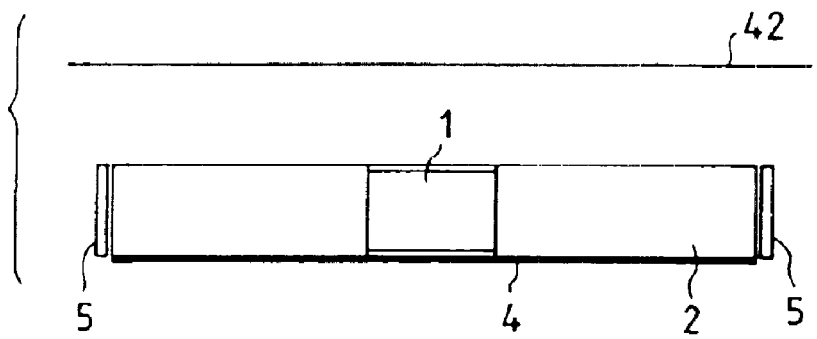
Figure 5D:
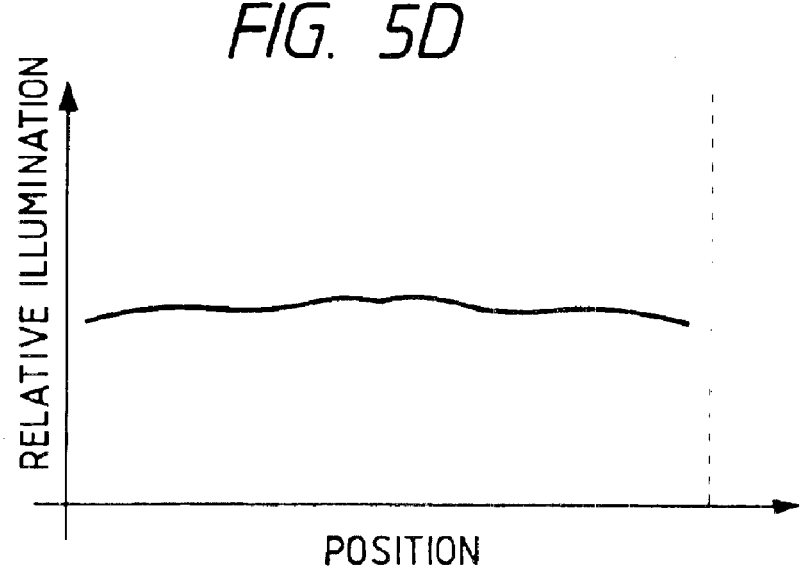

The present embodiment is featured by a fact, as shown in FIG. 5A, that the cross sectional area of the translucent member 2 decreases from the light entrance face 3 toward the end faces thereof.

This is because the proportion of the light beam, introduced from the entrance face 3 and propagating in the translucent member 2 by reflection or scattering in the area 6, entering the area 4 before reaching the ends of the translucent member 2 increases in inverse proportion to the cross sectional area. Thus the illumination intensity can be made higher with the increase in the distance from the light source 1, in comparison with that of the first embodiment shown in FIG. 4D.

Naturally the variation in the cross sectional area is preferably determined in consideration of the length of the translucent member 2, the width of the area 4, the thickness and the cross section of the translucent member 2, the size and the position of the light source 1.

Also the above-mentioned variation of the cross sectional area may be achieved either by a linear change or a curved change of the face of the translucent member 2.

The translucent member 2 in the first or second embodiment may be composed of any translucent material such as glass, quartz, acrylic resin or polycarbonate resin, but a plastic material such as acrylic resin or polycarbonate resin is preferred in consideration of the cost, the weight and the ease of working.

Furthermore, the exit face opposed to the area 4 is shown as planar in the first and second embodiments, but it may also be formed as a convex lens to give directionality to the emitted light beam.

Such configuration is shown in a third embodiment.

[Third Embodiment]

Figure 6A:
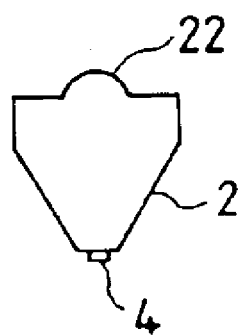
FIGS. 6A and 6B are respectively a schematic cross-sectional view and a schematic perspective view of a preferred embodiment of the illuminating device of the present invention.
Figure 6B:
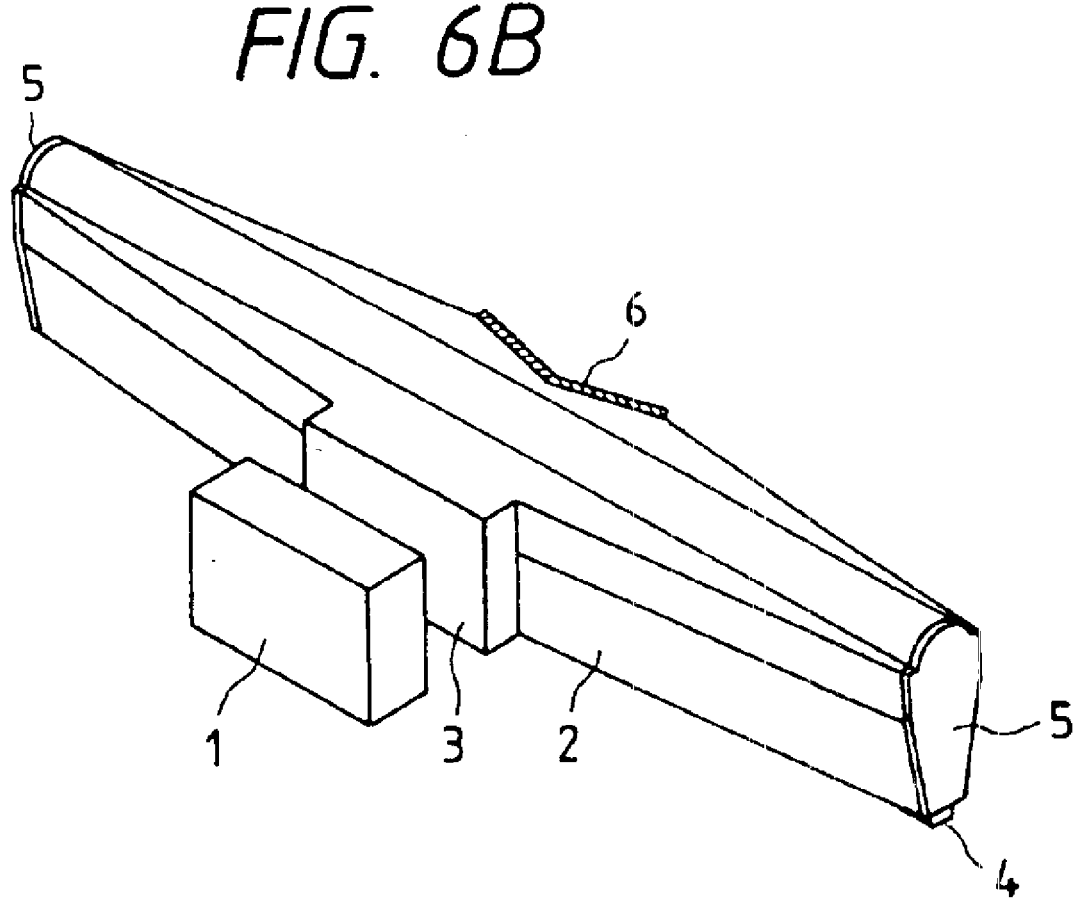

FIGS. 6A and 6B illustrate another embodiment of the translucent member of the illuminating device of the present invention, and are respectively a schematic cross-sectional view and a schematic perspective view. In the present embodiment, the translucent member is so formed that the cross sectional area decreases from the center toward both ends, and the exit face is formed as a convex lens 22 for condensing the light.

By forming the exit face as a convex lens form as light beam condensing means, the emitted illuminating light can be given directionality to increase the amount of the illuminating light.

The translucent member is shaped as a rectangular rod in the first embodiment, a rectangular rod with decreasing cross section toward the ends and a rod having a modified cross section including a convex lens in the third embodiment, but there may also be employed other shapes such as a cylindrical rod, a pentagonal or other polygonal rod, a cylindrical rod with decreasing cross section toward the ends, a pentagonal or other polygonal rod with decreasing cross section toward the ends, or combinations of the foregoing such as a rectangular rod with a convex lens.

In the foregoing embodiment, the convex lens is formed integrally with the translucent member, but a member corresponding to the convex lens may be adhered to the translucent member or positioned in the vicinity thereof. However the integral configuration is preferable in reducing the number of component parts and the number of manufacturing steps.

[Fourth Embodiment]

Figure 7:
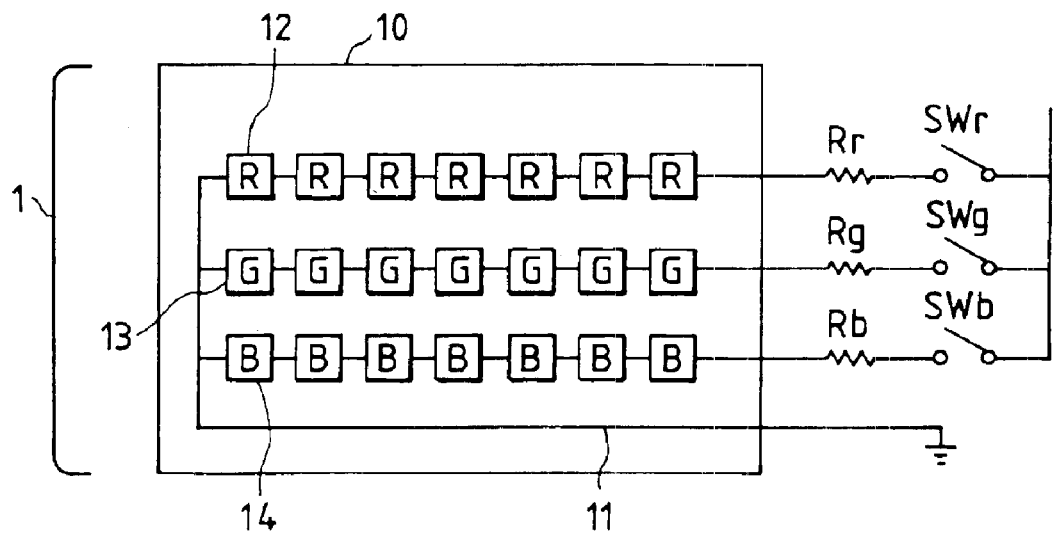
FIG. 7 is a schematic plan view of an example of the light source.

FIG. 7 shows an example of the configuration of the light sources of an illuminating device for color image reading, employing plural emission wavelengths.

FIG. 7 is a schematic plan view of the light source 1 for color image reading. On a substrate 10 with wirings 11, there are provided red LED 12, green LED 13 and blue LED 14 of mutually different emission wavelengths, limiting resistors Rr, Rg, Rb and switches SWr, SWg, SWb for selecting the wavelength, respectively corresponding to these LED's.

The color image reading can be achieved by turning on the red LED 12, green LED 13 and blue LED 14 in succession by correspondingly operating the switches SWr, SWg, SWb and processing the respective outputs of the sensor. In this case, the number and the layout of the LED's of respective colors are not particularly restricted. Naturally the LED's may emit the light of a single color or plural colors. Also they may emit the light of a same color. Also instead of the illustrated grouped wirings, the LED's may be individually turned on if necessary.

The above-explained light source can be used as the light source 1 in the foregoing embodiments.

[Fifth Embodiment]

Figure 8:
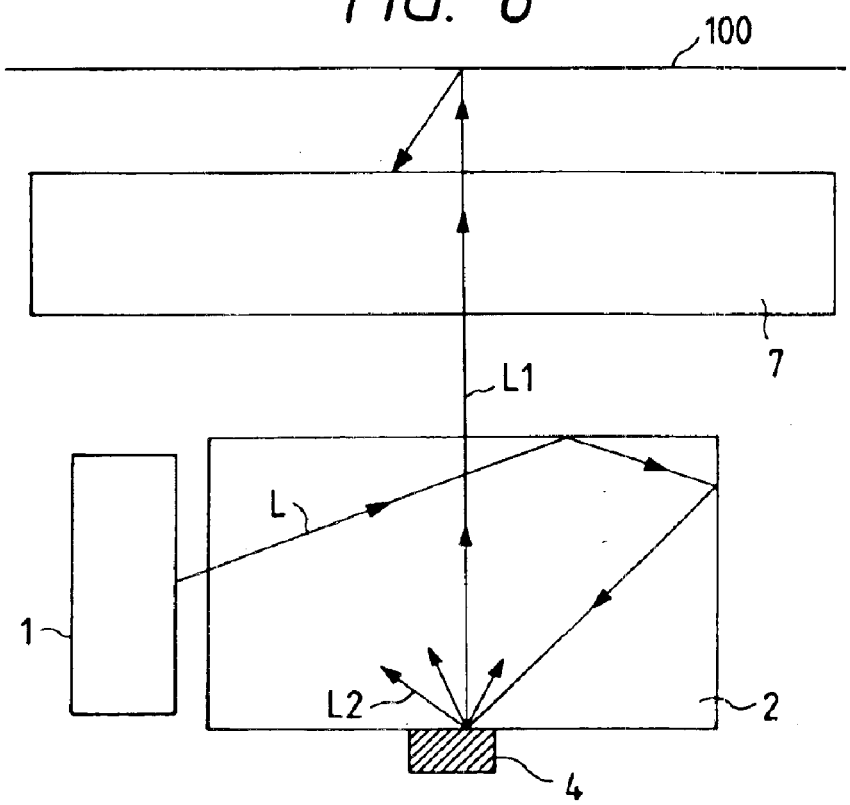
FIG. 8 is a schematic cross-sectional view of a part of an information processing apparatus.

FIG. 8 is a schematic cross-sectional view of a part of an information processing apparatus of the present invention, wherein components equivalent to those in FIGS. 1A to 2C are represented by same numbers. The present embodiment is an application of the illuminating device of the present invention to an information processing apparatus which is an optical image reading apparatus.

A translucent sensor substrate 7 is provided with a one-dimensional array of a plurality of photoelectric conversion elements, formed by a thin semiconductor film such as of amorphous silicon or polycrystalline silicon.

The translucent sensor substrate 7 is provided thereon with an unrepresented protective layer, for protecting the unrepresented photoelectric conversion elements from contact with the original.

A light beam emitted from the light source 1 propagates in the translucent member 2 by reflections therein, and a part of the light beam is reflected or scattered by the area 4 and emerges from the translucent member 2.

The emitted light is transmitted by an unrepresented illuminating window of the translucent sensor substrate 7 and illuminates an original 100. Within the reflected portion of the illuminating light, a portion returning to the translucent sensor substrate 7 is converted into electrical signals by the unrepresented photoelectric conversion elements.

The optical image reading device of the present embodiment allows to provide an information processing apparatus with a compact illuminating device of a low cost and a uniform light intensity distribution of a level not achievable in the prior art.

Figure 9:
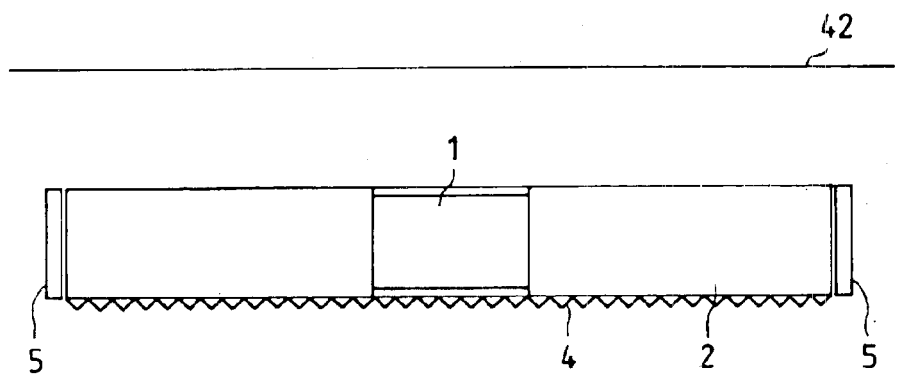
FIG. 9 is a schematic lateral view of an illuminating device of the present invention.

In the present invention, the area 4 may be composed of a reflecting or diffusing face of a sawtooth shape, as illustrated in FIG. 9.

Also the light source 1 need not necessarily be positioned at the center of the translucent member 2 but may be deviated toward an end thereof, as long as the required illumination intensity distribution can be obtained.

[Sixth Embodiment]

Figure 10:
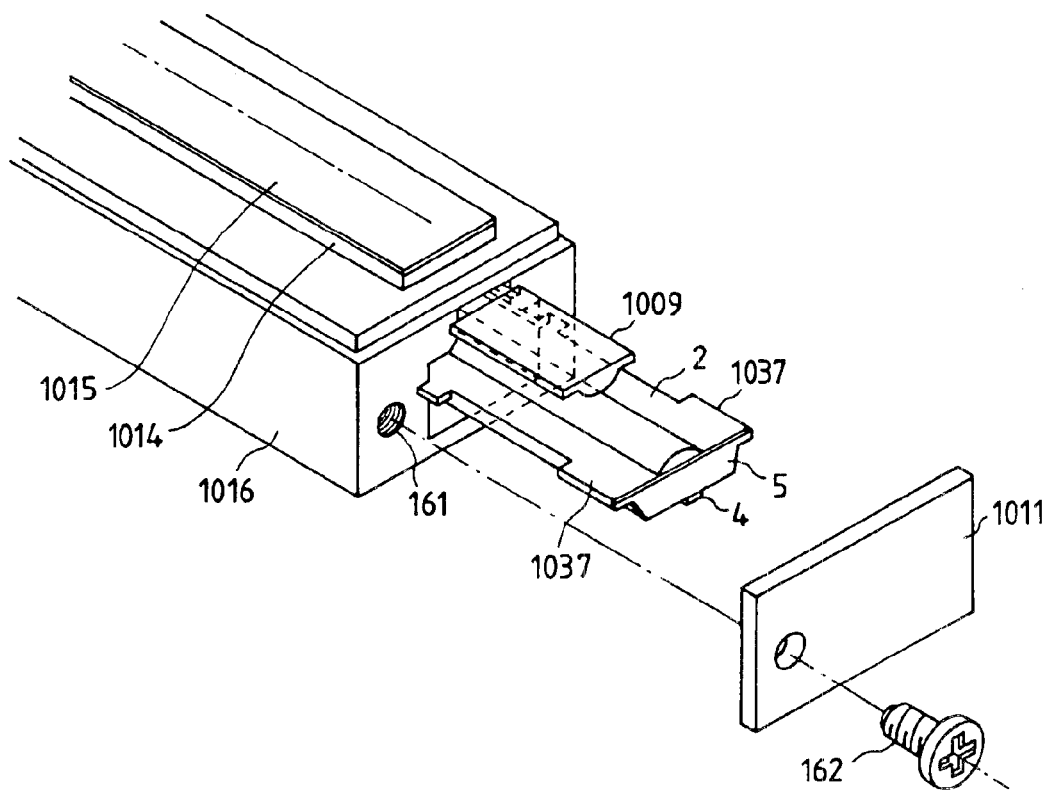
FIG. 10 is a schematic perspective view of a photoelectric conversion device having the illuminating device of the present invention.

FIG. 10 is a schematic perspective view of a photoelectric image reading device utilizing the illuminating device of the present invention, wherein shown area a sensor substrate 1014, a protective glass 1015 and a casing 1016 of the photoelectric conversion device. The sensor substrate 1014 is provided thereon with a linear array or plural arrays of a plurality of photoelectric conversion elements, formed with a thin semiconductor layer such as of amorphous silicon or polycrystalline silicon. The protective glass 1015 is provided on the unrepresented photoelectric conversion elements, for protecting the same from breakage by contact with the original. The casing 1016 is provided therein with a space for fitting the illuminating device and a cylindrical lens 1009, which can be inserted from an end side and set in a predetermined position. The LED light source 1 is provided on a protruding portion (not shown) of the translucent member 2, which is maintained in position by a screw 162 fitted in a threaded hole 161.

The translucent member 2 is provided with a mounting portion 1037 for engaging with the casing 1016, but such mounting portion 1037 is not indispensable and is not limited to the illustrated shape. Such mounting portion 1037 may also be provided in the translucent member 2 in the foregoing first to third embodiments.

[Seventh Embodiment]

In the following there will be explained an application of the illuminating device of the present invention to an information processing apparatus.

Figure 11:
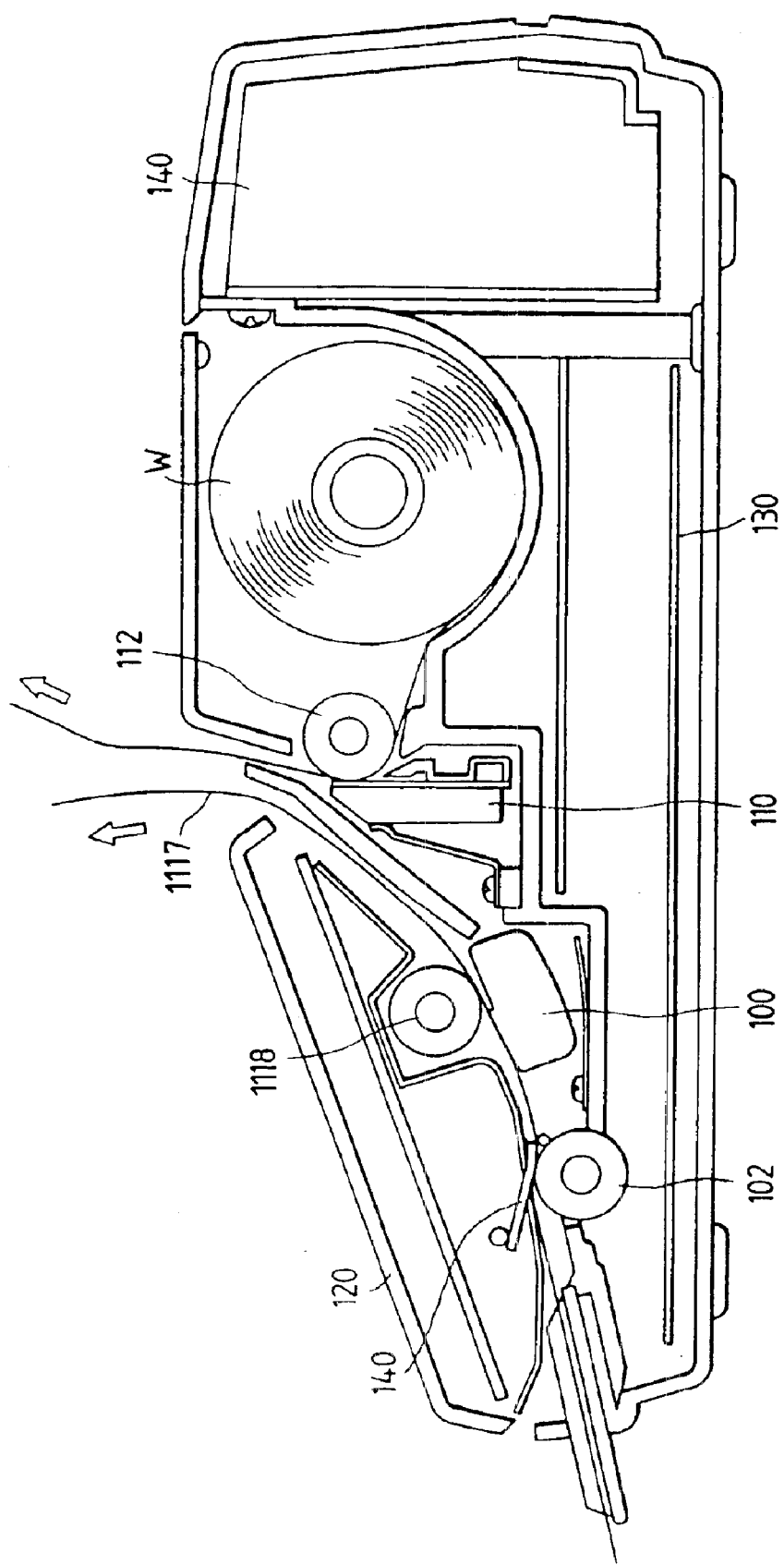
FIG. 11 is a schematic cross-sectional view of an example of the information processing apparatus.

FIG. 11 shows an example of the information processing apparatus, such as a facsimile apparatus, constructed with the photoelectric conversion device of the present invention.

There are shown a feed roller 102 for feeding an original 1117 toward a reading position, a separating piece 104 for securing separating the originals P, and a transport roller 1118 provided at the reading position of a photoelectric conversion device 100 for defining the read surface of the original 1117 and for transporting the original 1117.

A recording medium W in the form of a rolled sheet records the image information read by the photoelectric conversion device 100 or transmitted from the outside in case of facsimile transmission. A recording head 110 for image formation can be of various types, such as a thermal head or an ink jet recording head. Also it can be of a serial type or a line type. A platen roller 112 transports the recording medium W to a recording position by the recording head 110 and defines the recording face of the recording medium W.

An operation panel 120 is provided with switches for entering instructions for operations and a display unit for displaying various messages and the status of the device.

A system control board 130 is provided with a control unit for controlling various units, a drive circuit for the photoelectric conversion elements, an image information processing unit, a transmission/reception unit etc. There is also provided a power supply unit 140.

Figure 12:
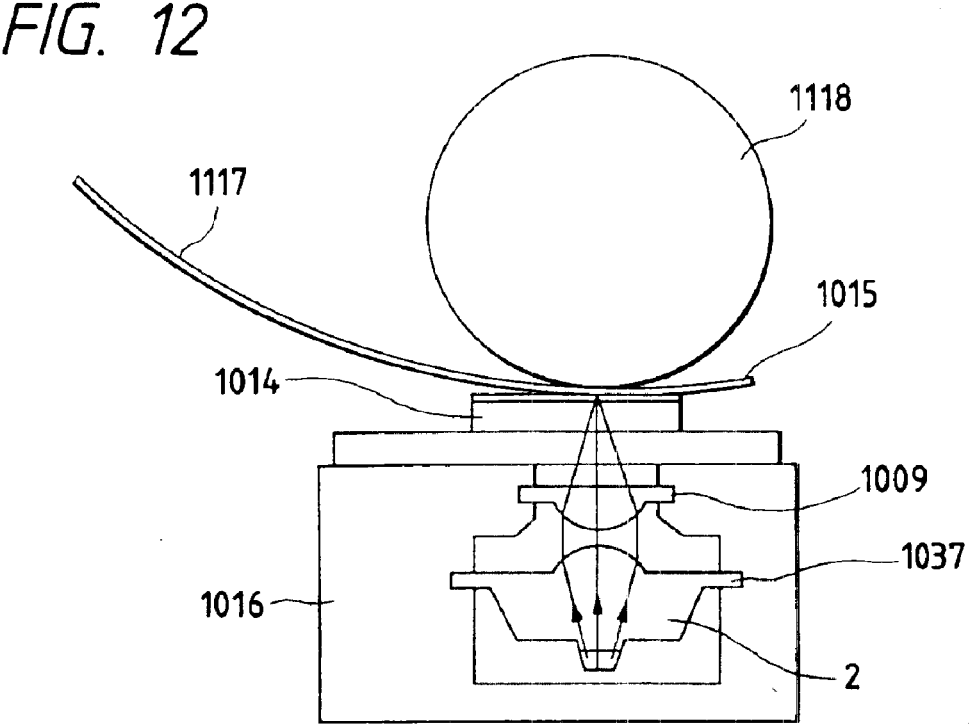
FIGS. 12, 13 and 14 are schematic magnified partial cross-sectional views of the vicinity of an image reading unit of the information processing apparatus.
Figure 13:
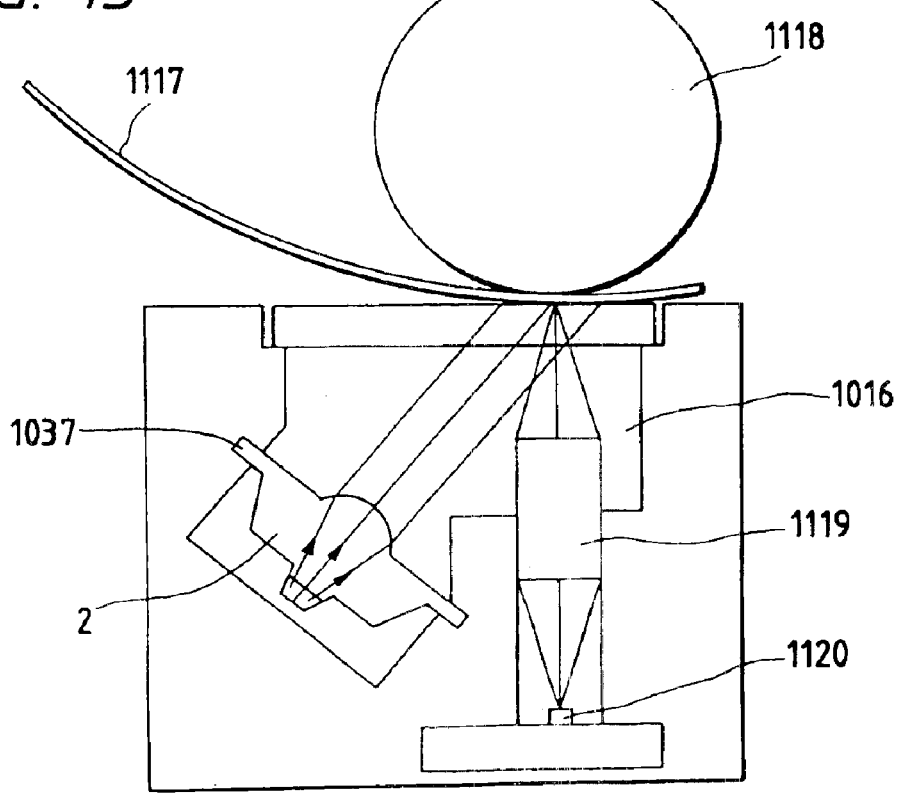

FIGS. 12 and 13 are schematic magnified views of the photoelectric conversion device of the information processing apparatus shown in FIG. 11. FIG. 12 shows a configuration with a complete contact sensor, while FIG. 13 shows a configuration with an imaging optical system 1119 capable of light condensation. A light beam emitted from illuminating means illuminates the original 1117, and the light reflected according to the image information is focused on the photoelectric conversion elements 1120 through the imaging optical system 1119.

Figure 14:
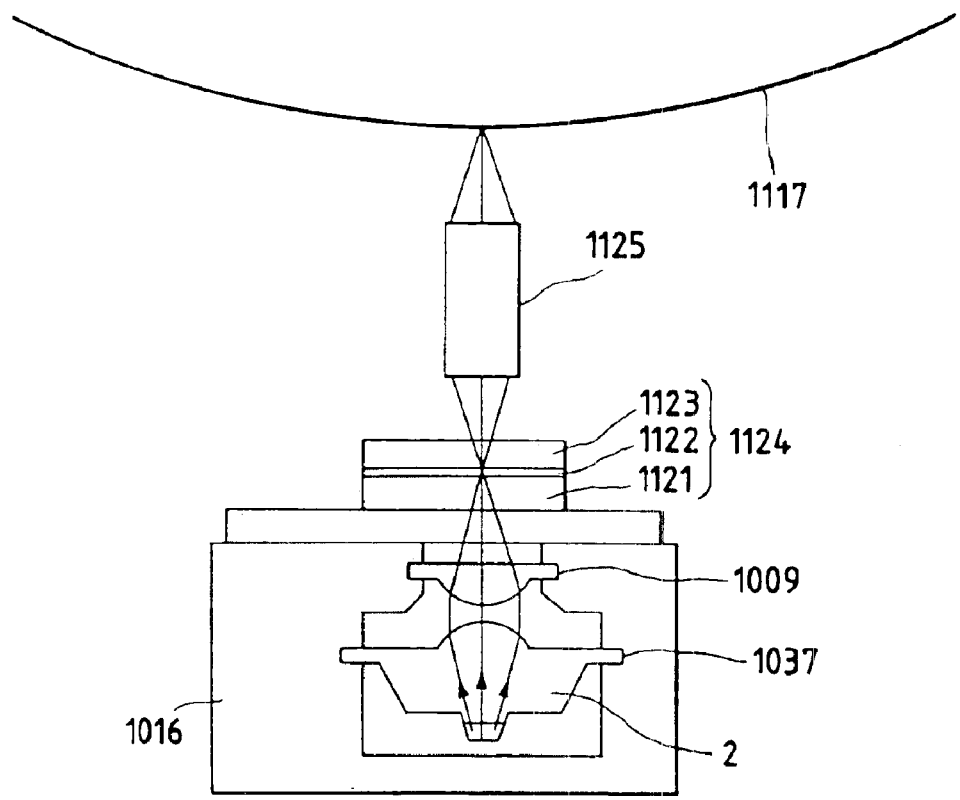

Also there may be employed a configuration shown in FIG. 14, in which an imaging optical system 1125 is provided at the side of the original, and the image is focused, through a protective glass 1123, on photoelectric conversion elements 1122 formed with a thin semiconductor film formed on a sensor substrate 1121.

In either case, the original could be illuminated with an extremely uniform distribution of the illumination intensity and the image reading could be achieved in splendid manner.

Also the illuminating devices shown in the first to third embodiments enabled much superior image reading, in comparison with the conventional illuminating devices.

The illuminating device of the present invention, being capable of providing a sufficient amount of light, is also suitable for color image reading. Also for adjusting the color temperature of the illuminating light, there may be provided a filter between the LED light source and the translucent member 2, or the translucent member 2 itself may be suitably dyed. In case of such dyeing of the translucent member, it is preferred to dye the entrance face, but, if the dyeing of a surface only is enough, it is desirable to dye the exit face of the translucent member, because the coloring or dyeing of the entire translucent member causes significant attenuation of the light beam in the course of internal reflections, thus resulting in a decrease of the light amount at the center (or in a location distant from the LED light source).

For the information output in the information processing apparatus shown in FIG. 11, there can be utilized thermal recording or thermal transfer recording with a thermal head, or ink jet recording with an ink jet recording head.

Among various ink jet recording methods, the present invention brings about a particular effect when applied to a recording head of a system utilizing thermal energy for ink discharge, because the information processing apparatus can exploit the effect of compactization of the illuminating device, as the recording head itself can be made compact.

The principle and representative configuration of such recording method are disclosed, for example, in the U.S. Pat. Nos. 4,723,129 and 4,740,796. This system is applicable to so-called on-demand recording or continuous recording, but is particularly effective in the on-demand recording because the entire apparatus can be compactized.

In this system, in brief, in response to the application of at least a drive signal representing the recording information to an electrothermal converter element positioned corresponding to a liquid channel or a sheet containing liquid (ink) therein, the element generates thermal energy capable of causing a rapid temperature incase exceeding the nucleus boiling point, thereby inducing film boiling on a heat action surface of the recording head and thus forming a bubble in the liquid (ink), in one-to-one correspondence with the drive signal. The liquid (ink) is discharged through a discharge opening by the growth and contraction of the bubble, thereby forming at least a liquid droplet. The drive signal is preferably formed as a pulse, as it realizes instantaneous growth and contraction of the bubble, thereby attaining highly responsive discharge of the liquid (ink).

Such pulse-shaped drive signal is preferably that disclosed in the U.S. Pat. Nos. 4,463,359 and 4,345,262. Also the conditions described in the U.S. Pat. No. 4,313,124 relative to the temperature increase rate of the heat action surface allows to obtain further improved recording.

The configuration of the recording head is given by the combinations of the liquid discharge openings, liquid channels and electrothermal converter elements with linear or rectangular liquid channels, disclosed in the above-mentioned patents, but a configuration disclosed in the U.S. Pat. No. 4,558,333 in which the heat action part is positioned in a flexed area, and a configuration disclosed in the U.S. Pat. No. 4,459,600 also belong to the present invention.

Furthermore the present invention is effective in a structure disclosed in the Japanese Patent Laid-open Application No. 59-123670, having a slit common to plural electrothermal converter elements as a discharge opening therefor, or in a structure disclosed in the Japanese Patent Laid-open Application No. 59-138461, having an aperture for absorbing the pressure wave of thermal energy, in correspondence with each discharge opening.

A full-line type recording head, capable of simultaneous recording over the entire width of the recording sheet, may be obtained by plural recording heads so combined as to provide the required length as disclosed in the above-mentioned patents, or may be constructed as a single integrated recording head, and the present invention can more effectively exhibit its advantages in such recording head.

The present invention is furthermore effective in a recording head of interchangeable chip type, which can receive ink supply from the main apparatus and can be electrically connected therewith upon mounting thereon, or a recording head of cartridge type in which an ink cartridge is integrally constructed with the recording head.

Also the recording apparatus is preferably provided with the emission recovery means and other auxiliary means for the recording head, for attaining further advanced maintenance-free character.

Examples of such means for the recording head include capping means, cleaning means, pressurizing or suction means, preliminary heating means composed of electrothermal converter element and/or another heating device, and means for effecting an idle ink discharge independent from the recording operation, all of which are effective for achieving stable recording operation.

Furthermore, the recording mode is not limited to the recording of a single main color such as black, but can be the recording of plural different colors or full color, wherein the recording head is either integrally constructed or is composed of plural units.

Furthermore, though the foregoing explanation has been made on liquid ink, it is also applicable to ink which is solid below room temperature but softens or liquefies at room temperature, or which softens or liquefies within a temperature control range from 30° C. to 70° C., which is ordinarily adopted in the ink jet recording. Thus the ink only needs to be liquidous when the recording signal is given. Besides the ink may be changed from solid state to liquid state by intentional temperature increase by thermal energy.

In the following there will be given a brief explanation on the ink jet recording head, utilized in such recording method by liquid discharge, utilizing thermal energy.

Figure 15:
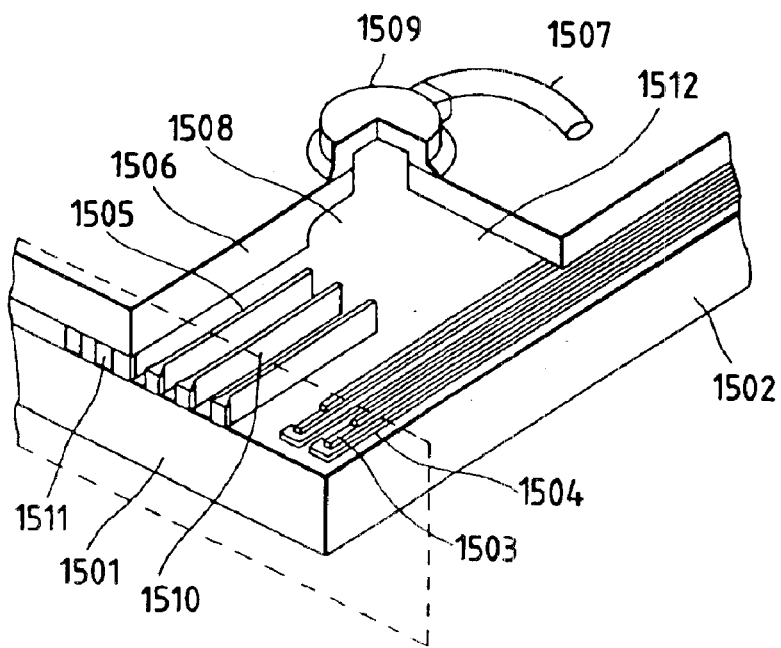
FIG. 15 is a partially cut-off schematic perspective view of an example of the ink jet recording head.

FIG. 15 is a brief view illustrating an example of such ink jet recording head, composed of electrothermal converters 1503 and electrodes 1504, formed on a substrate 1502 through a semiconductor manufacturing process for example by etching, evaporation, sputtering etc., with liquid channels 1505 and a ceiling plate 1506. The recording liquid 1512 is supplied from an unrepresented liquid reservoir, through a liquid supply tube 1507, to a common liquid chamber 1508 of the recording head 1501. 1509 indicates a connector for the liquid supply tube.

The liquid 1512 supplied into the common liquid chamber 1508 is supplied by so-called capillary phenomenon into the liquid channels 1510 and is stably maintained therein by forming meniscus at the discharge opening at the end of the liquid channel. By energization of the electrothermal converter 1503, the liquid present thereon is rapidly heated to form a bubble in the liquid channel, and the liquid is discharged from the opening 1511 and forms a liquid droplet by expansion and contraction of the bubble.

By arranging the discharge openings of the above-explained configuration with a density of 16 nozzles/mm or higher, there can be obtained a recording head with 128 or 256 discharge openings, or a full-line recording head having the discharge openings over the entire recording width.

Figure 16:
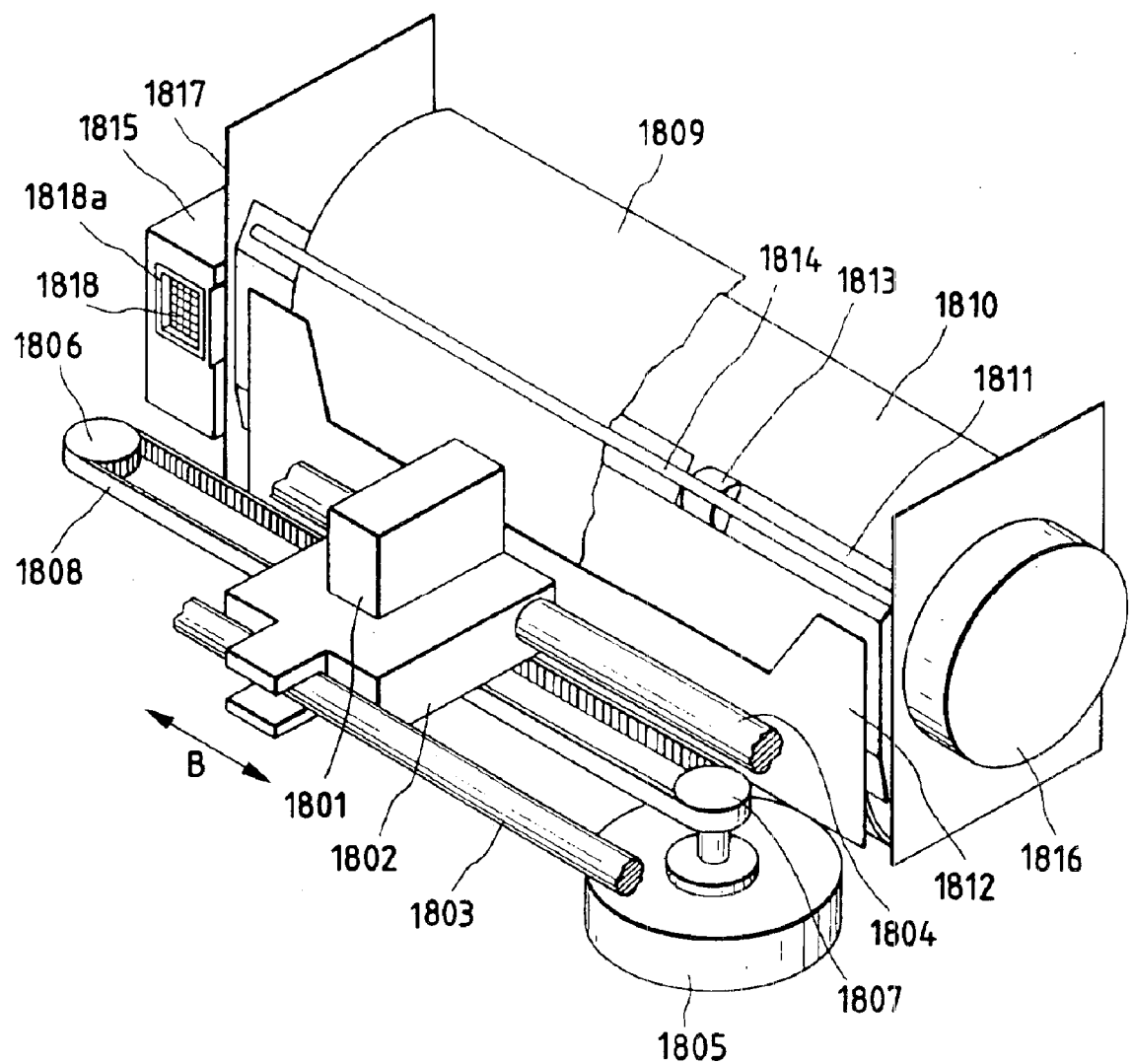
FIGS. 16 and 18 are schematic perspective view showing examples of an output unit of the information processing apparatus.

FIG. 16 is a perspective view schematically showing the related configuration of the output unit utilizing the ink jet recording method.

In FIG. 16 there are shown an ink jet recording head 1801 for recording an image by ink discharge corresponding to recording signals; and a carriage 1802 for moving the recording head 1801 in the recording (main scanning) direction. The carriage 1802 is slidably supported by guide shafts 1803, 1804 and is reciprocated in the main scanning direction by a timing belt 1808, which is supported by pulleys 1806, 1807 and is driven by a carriage motor 1805 through the pulley 1807.

A recording sheet 1809 is guided by a paper pan 1810 and is transported by an unrepresented feed roller, maintained in contact with pinch rollers.

The sheet feeding is achieved by a sheet feed motor 1816. Thus transported recording sheet 1809 is given a tension by a discharge roller 1813 and a spur 1814 and is transported in contact with a heater 1811 by an elastic sheet pressing plate 1812. The recording sheet 1809, bearing the ink discharged from the recording head 1801, is heated by the heater 1811 whereby the deposited ink is fixed to the sheet 1809 by water evaporation.

A recovery unit 1815 maintains the proper discharge characteristics by eliminating dusts and viscous ink adhered to the discharge openings (not shown) of the recording head 1801.

A cap 1818a, constituting a part of the recovery unit 1815 serves to cap the discharge openings of the recording head 1801, thereby preventing clogging thereof. Inside the cap 1818a, there is preferably provided an ink absorbent member 1818.

Also at the side of the recording area, the recovery unit 1815 is provided with a blade 1817 for contacting a face, bearing the discharge openings, of the recording head 1801, for removing the dusts and ink deposited on this face.

Figure 17:
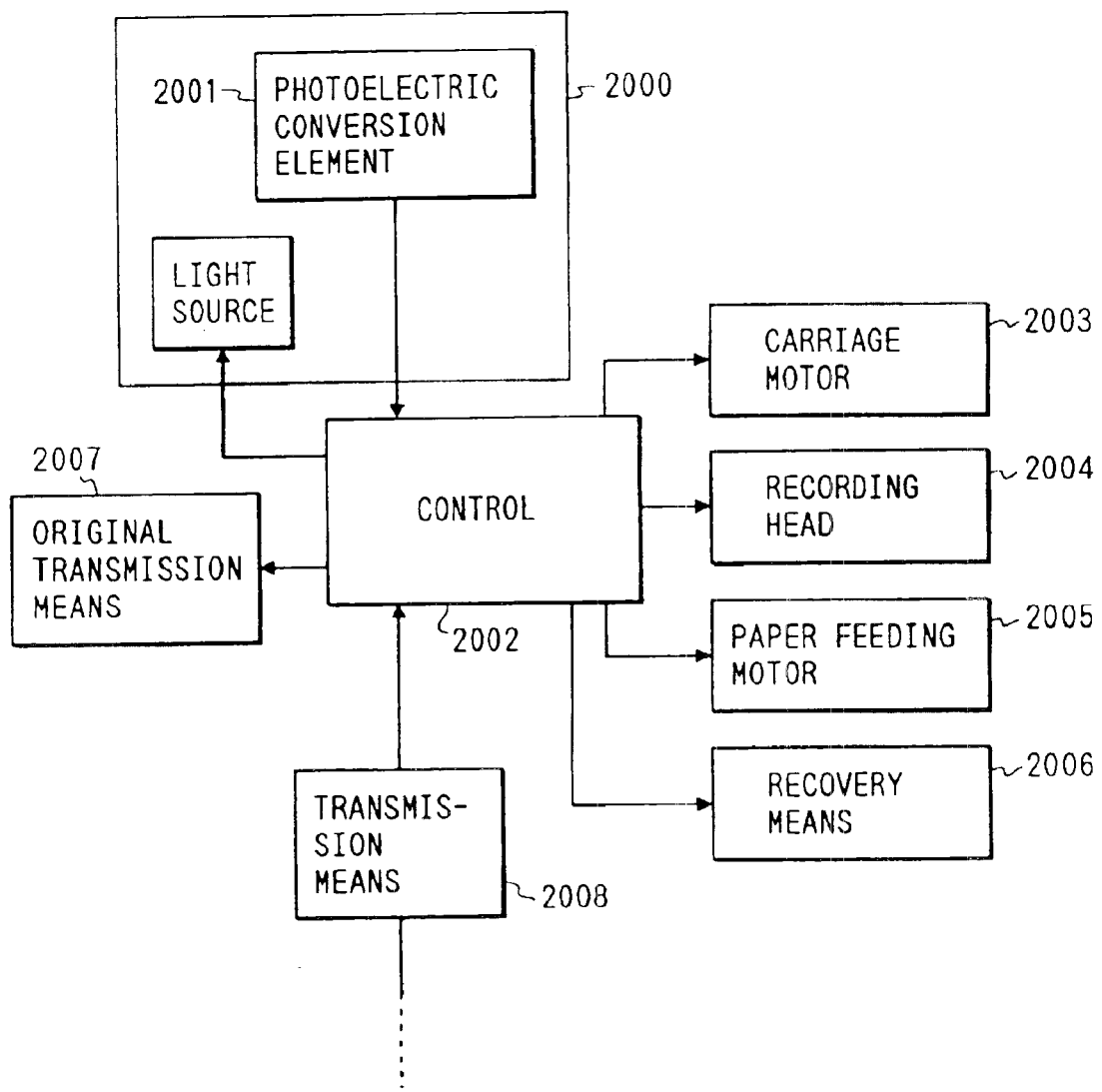
FIG. 17 is a schematic block diagram of an example of the information processing apparatus.

Referring to a block diagram in FIG. 17, an original supplied by original transmission means 2007 to the reading position of a reading device 2000 is read by photoelectric conversion elements 2001 therein, and electric signals bearing the image information are converted by image process means (not shown) into electric recording signals. A CPU 2002 effects recording by controlling a carriage motor 2003, a recording head 2004, a sheet feed motor 2005, a recovery unit 2006 etc.

The electrical signal bearing the image information may also be transmitted to another image processing apparatus for image output through communication means 2008, or may be received from another information processing apparatus through the communication means 2008 and recorded by the recording head 2004.

Figure 18:
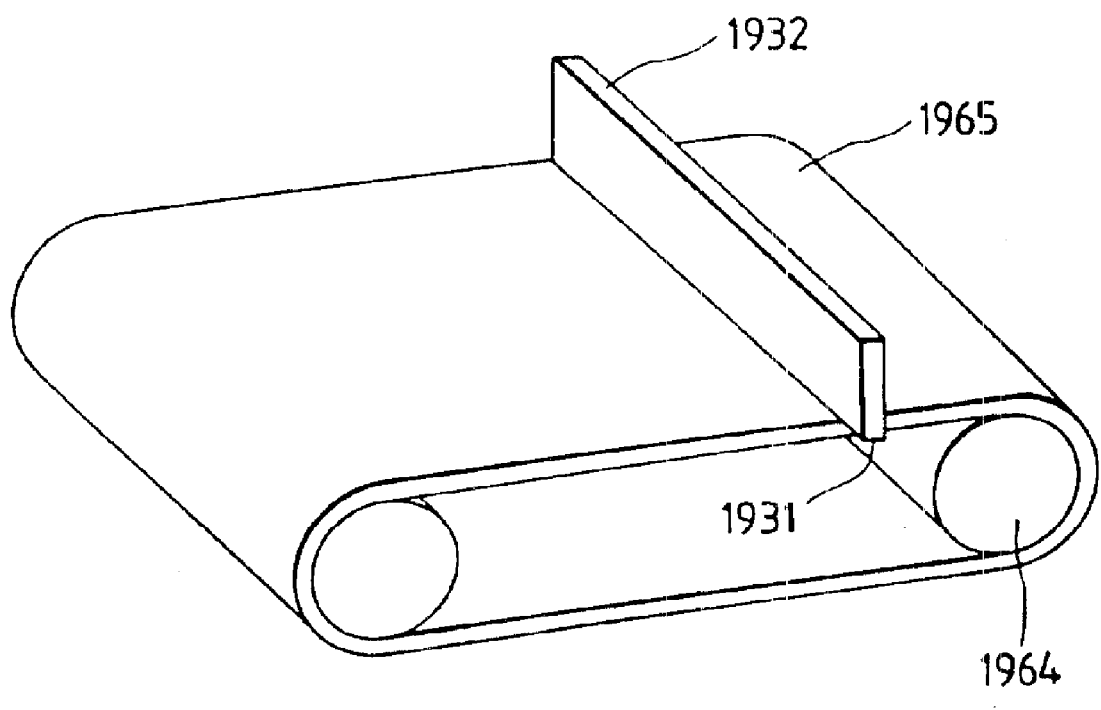

FIG. 18 schematically shows the output unit employing a full-line recording head 1932.

In FIG. 18, a conveyor belt 1965 transports an unrepresented recording medium, by the rotation of a transport roller 1964. The recording head 1932 is provided, on a lower face 1931 thereof, with a plurality of discharge openings corresponding to the recording area of the recording medium.

Also in this case the recording can be achieved in a similar manner as in the serial recording head explained in the foregoing.

The output unit explained above merely shows an example and is naturally subject to various modifications.

However the ink jet recording method utilizing thermal energy, being capable of further compactization and more precise recording, allows to fully exploit the effects of the present invention and to obtain an excellent information processing apparatus in its entirety.

As explained in the foregoing, the present invention can provide an illuminating device which can achieve uniform illumination of a high intensity with a compact dimension.

Also the present invention can provide an illuminating device which is simple in configuration and can simplify the manufacturing process.

In addition the present invention can provide a photoelectric conversion device and an information processing apparatus, capable of stable image reading.

The illuminating device of the present invention is not limited to the foregoing embodiments but is applicable also to other optical image reading devices, utilizing lenses. It is also adapted for use as the light source for a recording apparatus utilizing a liquid crystal shutter array, or as a photosensitive drum eraser for a copying machine or a laser beam printer.

The present invention is not limited to the foregoing embodiments but is subject to various modifications and combinations within the scope and spirit of the appended claims.

What is claimed is:

1. An image reading apparatus including an illuminating device adapted to illuminate an original and a photoelectric converting device adapted to effect photoelectric conversion on the light from the original, the illuminating device including a light conductive member having a rod-shaped member, the light conductive member comprising:

a first face that is a longitudinal face of the rod-shaped member, said first face including a light entrance face onto which the light is incident;

a second face which is a longitudinal face opposite to said first face, said second face including a first area which is approximately parallel to said first face, and a second area which is inclined so that a distance between said first face and said second face becomes shorter along the longitudinal direction, wherein the light entrance face is under the second area of said second face; and a light exit area adapted to emit at least a part of the light to the outside of the rod-shaped member.

2. An apparatus according to claim 1, further comprising a light source that includes an LED.

3. An apparatus according to claim 1, further comprising a light source that includes a plurality of light-emitting elements, each light-emitting element having different light emission wavelength ranges.

4. An apparatus according to claim 3, wherein said light source comprises LEDs.

5. An apparatus according to claim 1, further comprising a drive unit, said drive unit being adapted to shift a positional relationship between the original and the photoelectric converting device.

6. An apparatus according to claim 1, further comprising a light reflecting and/or diffusing area provided on the first face, said light reflecting and/or diffusing area being adapted to reflect and/or diffuse the light to said light exit area and inclined with respect to a longitudinal axis of the rod-shaped member.

* * * * *